US012632723B2

(12) United States Patent
Racape et al.

(10) Patent No.: US 12,632,723 B2
(45) Date of Patent: May 19, 2026

(54) LOW DISPLACEMENT RANK BASED DEEP NEURAL NETWORK COMPRESSION

(71) Applicant: INTERDIGITAL VC HOLDINGS, INC., Wilmington, DE (US)

(72) Inventors: Fabien Racape, San Francisco, CA (US); Swayambhoo Jain, Milpitas, CA (US); Shahab Hamidi-Rad, Sunnyvale, CA (US); Dimitris Papadimitriou, Berkeley, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 1176 days.

(21) Appl. No.: 17/438,079

(22) PCT Filed: Mar. 13, 2020

(86) PCT No.: PCT/US2020/022585
§ 371 (c)(1),
(2) Date: Sep. 10, 2021

(87) PCT Pub. No.: WO2020/190696
PCT Pub. Date: Sep. 24, 2020

(65) Prior Publication Data
US 2022/0188633 A1     Jun. 16, 2022

Related U.S. Application Data

(60) Provisional application No. 62/818,914, filed on Mar. 15, 2019.

(51) Int. Cl.
*G06N 3/08* (2023.01)
(52) U.S. Cl.
CPC ..................................... *G06N 3/08* (2013.01)

(58) Field of Classification Search
None
See application file for complete search history.

(56) References Cited

U.S. PATENT DOCUMENTS 11,423,259 B1 *    8/2022   Pratusevich ........... G06N 20/00
2017/0076196 A1    3/2017   Sainath et al.
(Continued)

FOREIGN PATENT DOCUMENTS

CN     107145940 A     9/2017
CN     107396124 A     11/2017
(Continued)

OTHER PUBLICATIONS

Sainath, et al., "Low-rank matrix factorization for Deep Neural Network training with high-dimensional output targets," 2013 IEEE International Conference on Acoustics, Speech and Signal Processing, Vancouver, BC, Canada, 2013, pp. 6655-6659, doi: 10.1109/ICASSP.2013.6638949 (Year: 2013).*
(Continued)

*Primary Examiner* — Luis A Sitiriche
(74) *Attorney, Agent, or Firm* — Volpe Koenig

(57) ABSTRACT

A method and an apparatus for performing deep neural network compression use an approximation training set along with information, such as in matrices representing weights, biases and non-linearities, to iteratively compress a pre-trained deep neural network by low displacement rank based approximation of the network layer weight matrices. The low displacement rank approximation allows for replacement of an original layer weight matrices of the pre-trained deep neural network as the sum of a small number of structured matrices, allowing compression and low inference complexity.

6 Claims, 11 Drawing Sheets

(56) References Cited

U.S. PATENT DOCUMENTS

| | | | |
|---|---|---|---|
| 2018/0107925 A1 | 4/2018 | Choi et al. | |
| 2018/0114145 A1 | 4/2018 | Holtmann-Rice et al. | |
| 2018/0184123 A1 | 6/2018 | Terada et al. | |
| 2018/0239992 A1 | 8/2018 | Chalfin et al. | |
| 2018/0293758 A1 | 10/2018 | Bar-On et al. | |
| 2019/0034781 A1 | 1/2019 | Asano et al. | |
| 2019/0042926 A1 | 2/2019 | Baghsorkhi et al. | |
| 2020/0184318 A1 | 6/2020 | Minezawa et al. | |
| 2021/0195206 A1 * | 6/2021 | Hannuksela | H04N 19/149 |

FOREIGN PATENT DOCUMENTS

| | | | | |
|---|---|---|---|---|
| EP | 3451293 A1 | | 3/2019 | |
| JP | 2019028746 A | | 2/2019 | |
| KR | 20200115239 A | * | 10/2020 | |
| WO | 2002005208 A2 | | 1/2002 | |
| WO | 2003025512 A2 | | 3/2003 | |
| WO | 2016199330 A1 | | 12/2016 | |
| WO | 2019008752 A1 | | 1/2019 | |
| WO | WO-2019086104 A1 * | 5/2019 | | G06N 3/08 |

OTHER PUBLICATIONS

Cheng, et al., (Oct. 27, 2015) "An Exploration of Parameter Redundancy in Deep Networks with Circulant Projections," arXiv:1502.03436v2 (Year: 2015).*
Hou, Jilei (Mar. 11, 2019) "Here's why quantization matters for AI," QualComm (Year: 2019).*
Bovik, AI. (2009) "The Essential Guide to Video Processing Chapter 8 Basic Transform Video Coding," ISBN 973-0-12-374456-2, doi.org/10.1016/B978-0-12-374456-2.X0001-1 (Year: 2009).*
Sindhwani et al., Structured Transforms for Small-Footprint Deep Learning, In Advances in Neural Information Processing Systems, pp. 3088-3096, (2015).

Zhao et al., Theoretical Properties for Neural Networks with Weight Matrices of Low Displacement Rank, Mar. 1, 2017, Retrieved from the Internet: URL:http:/arxiv.org/pdf/1703.00144.pdf, retrieved on May 7, 2020.
ISO/IEC JTC1/SC29/WG11/N18162: Updated Call for Proposals on Neural Network Compression; Coding of Moving Pictures and Audio; Marrakech Jan. 2019.
Pan, et al., Inversion of Displacement Operators, SIAM Journal on Matrix Analysis and Applications, vol. 24.3, p. 660-677, 2003.
Thomas et al., Learning Compressed Transforms with Low Displacement Rank, arxiv.org, Cornell University Library, 201 Olin Library Cornell University, Ithaca, NY, 14853, Oct. 4, 2018.
ISO/IEC JTC1/SC29/WG11/N18129: Updated Evaluation Framework for Compressed Representation of Neural Networks, Coding of Moving Pictures and Audio; Marrakech; Jan. 2019.
Ding et al., On the Universal Approximability and Complexity Bounds of Quantized ReLU Neural Networks, pp. 10, arXiv, Feb. 10, 2018, Revised on Jan. 12, 2019 Version 4—pp. 1-19.
"Use cases and requirements for compressed representation of neural networks", ISO/IEC JTC1/SC29/WG11/N17740, Apr. 2018, San Diego, CA, USA, 34 pages.
Nagao et al., "Encyclopedic dictionary of computer Science", 1st printing, May 25, 1990, Iwanami Shoten, Publishers, p. 590, ISBN: 4-00-080074-4, May 25, 1990.
Machine Translation—Nagao et al., Encyclopedic Dictionary of Computer Science, Feb. 12, 2024.
Lu et al., "Learning Compact Recurrent Neural Networks", Proceedings of 2016 IEEE International Conference on Acoustics, Speech and Signal Processing (ICASSP 2016), pp. 5960-5964, IEEE, Mar. 25, 2016.
Takei, "With Exercises by the Deep Learning Open Source "Caffe" for the First time", 1st ed., Mar. 4, 2016, Ric Telecom K.K., pp. 111-115 and 123.
Takei, "With Exercises by the Deep Learning Open Source "Caffe" for the First time"—Translation in English—Feb. 27, 2024.
Han et al., "Deep compression: Compressing deep neural networks with pruning, trained quantization and huffman coding"; ICLR 2016, Feb. 15, 2016, 14 pages. / Feb. 15, 2016.

* cited by examiner

600

601
Start

610
Obtain information representative of deep neural network, and an approximation training set 620
Generate output matrices of information for a layer of the deep neural network 630
Update matrices for additional layers iteratively until a minimization criterion has been met for that layer, and until a last layer is reached 640
Quantization and entropy coding

700

701
Start

710
Entropy Decoding

720
Inverse quantization

730
Iteratively obtain dequantized matrices of DNN and
Build weight matrices until a last layer is reached

LOW DISPLACEMENT RANK BASED DEEP NEURAL NETWORK COMPRESSION

TECHNICAL FIELD

At least one of the present embodiments generally relates to a method or an apparatus for video encoding or decoding.

BACKGROUND

To achieve high compression efficiency, image and video coding schemes usually employ prediction, including spatial and/or motion vector prediction, and transforms to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction. Mapping and inverse mapping processes can be used in an encoder and decoder to achieve improved coding performance. Indeed, for better coding efficiency, signal mapping may be used. Mapping aims at better exploiting the samples codewords values distribution of the video pictures.

SUMMARY

Drawbacks and disadvantages of the prior art may be addressed by the general aspects described herein, which are directed intra prediction mode partitioning in encoding and decoding.

According to a first aspect, there is provided a method. The method comprises steps for obtaining information representative of weights, biases and non-linearities of a deep neural network, and an approximation training set for the deep neural network; generating output matrices of information for a layer of the deep neural network using said information and the approximation training set; and, updating said output matrices for additional layers by iteratively using output matrices of previous layers of the deep neural network and said approximation training set until a minimization criterion has been met for that layer, and until a last layer is reached to generate coefficients representative of said output matrices; and, performing quantization and entropy coding on said coefficients.

According to a second aspect, there is provided a method. The method comprises steps for performing entropy decoding on data from a bitstream; performing inverse quantization on said entropy decoded data; and, iteratively obtaining dequantized matrices representative of a deep neural network and building weight matrices until a last layer is reached.

According to another aspect, there is provided an apparatus. The apparatus comprises a processor. The processor can be configured to compress and decompress a deep neural network by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
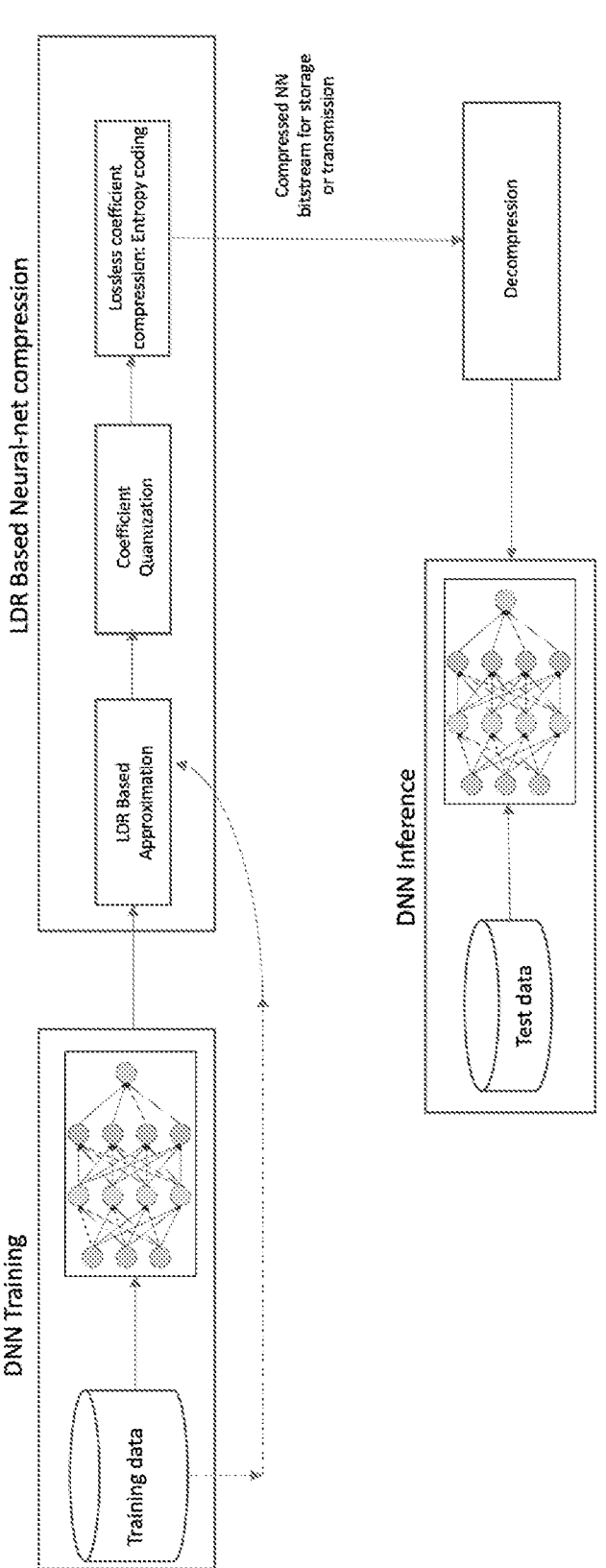
FIG. 1 shows a pipeline for low displacement rank based neural network compression under the general aspects described.

Deep Neural Networks (DNNs) have shown state of the art performance in variety of domains such as computer vision, speech recognition, natural language processing, etc. This performance however comes at the cost of massive computational cost as DNNs tend to have a huge number of parameters often running into millions, and sometimes even billions. This leads to prohibitively high inference complexity—the computational cost of applying trained DNN to test data for inference. This high inference complexity is the main challenge in bringing the performance of DNNs to mobile or embedded devices with resource limitations on battery size, computational power, and memory capacity etc.

This invention applies to compression of a pre-trained DNN so that it facilitates transmission and/or storage as well as low inference complexity. We propose compression of pre-trained DNN by Low Displacement Rank (LDR) based approximation of the network layer weight matrices. The LDR approximation allows for replacing the original layer weight matrices of the pre-trained DNN as the sum of small number of structured matrices. This decomposition into sum of structured matrices leads to simultaneous compression, and low inference complexity thereby enabling the power of Deep Learning in the resource limited devices.

Most of approaches for compression of DNNs are either based on sparsity-based assumption or low rank-based approximation. While these approaches lead to compression, they still suffer from the high inference complexity. The sparsity structure is difficult to implement in hardware as the performance depends critically on the pattern of sparsity, and the existing approaches do not have any control over the sparsity pattern. The low-rank matrices are still unstructured. Due to these reasons, these approaches do not necessarily lead to improvement in the inference complexity. The LDR based approximation proposed in this invention approximates the given layer weight matrix as a sum small number of structured matrices which allows for simultaneous compression and low inference complexity.

Suppose we are provided with a L-Layer pre-trained DNN with weight matrices $\{W_1, \ldots, W_L\}$, biases $\{b_1, \ldots, b_L\}$, and non-linearities $\{g_1, \ldots, g_L\}$. With these weights, biases, and non-linearities, the output of $k^{th}$ layer $y^{k+1}$ is written as follows (where $y^1 = x$ is the input to the DNN):

$$y^{k+1} = g_k(W_k y^k + b_k)$$

We propose to approximate the layers of pre-trained DNN $\{W_1, \ldots, W_L\}$ with LDR matrices $\{\hat{W}_1, \ldots, \hat{W}_L\}$. Suppose the $k^{th}$ layer weights matrix $\hat{W}_k$ has low rank $r_k \ll \min\{m, n\}$, then it implies that $$L_{A,B}(\hat{W}_k) = W_k - A W_k B = G_k H_k^T,$$

where A, B are square matrices of size m×m, n×n respectively, $G_k$ is a m×$r_k$ matrix, $H_k$ is n×$r_k$ matrix, and m, n are the number of rows and columns of the original weight matrix $W_k$. The columns of G and H can represent some sort of filters, for example. And depending on A and B they can interact in different ways end-to-end.

Here, the displacement $r_k$ is a parameter of choice. A small $r_k$ implies more compression and computational efficiency. Alternatively, the LDR can also be sought in an equivalent but an alternative expression as $$L_{A,B}(\hat{W}_k) = A W_k - W_k B = G_k H_k^T.$$

By different choices of A, B the LDR structure is general enough so that it covers a whole host of other structures such as Toeplitz, circulant, Hankel, etc. For the proposes of describing the invention we will use the first expression for displacement rank. In order to obtain such an approximation the proposed approach requires an approximation training set $\chi = \{x_1, \ldots, x_T\}$ which can be chosen as a subset of original training set used to train the given DNN or it may be chosen as set examples on the DNN it is supposed to operate on. Using the approximation training set $\chi$, we can obtain the output and input of each layer of the original pre-trained DNN. The input and output of the $k^{th}$ layer for a given example $x_t$ in the approximating set $\chi$ are denoted as $$y_{x_t}^k \text{ and } y_{x_t}^{k+1}.$$

With these, we solve the following optimization problem to obtain $G_k$, $H_k$:

$$\min_{\{G_k, H_k\}} \sum_{x_t \in \chi} l\left(y_{x_t}^{k+1} - g_k\left(\hat{W}_k y_{x_t}^k + b_k\right)\right) \text{ s.t } \hat{W}_k - A\hat{W}_k B = G_k H_k^T \quad (1)$$

The above problem can be approximately solved by using stochastic gradient descent algorithm. The term in the summation is being minimized. The equality constraint in above problem can be handled using the inversion formulae from "Inversion of Displacement Operators" by Pan and Wang. An exemplary over-all architecture for compressing a neural network is shown in FIG. 1. It shows the DNN training stage that involves training a DNN on the given training data. Next block takes the pre-trained DNN represented by weight matrices $\{W_1, \ldots, W_L\}$, biases $\{b_1, \ldots, b_L\}$, and non-linearities $\{g_1 \ldots, g_L\}$ as the input, and the approximation training set $\chi = \{x_1, \ldots, x_T\}$ and could work with an approximate training set that is independent from the training set. The first sub-step in LDR based compression block is the LDR based approximation, which is the object of this invention.

After this, the weight matrices $G_k$ and $H_k$ of each layer's LDR based approximation are quantized and this followed by lossless coefficient compression for each layer.

This results in a bitstream that may be stored or transmitted. The resulting bitstream along with meta data involves matrices A, B, the bias vectors $\{b_1, \ldots, b_L\}$, and description of non-linearities are sent. The compressed bitstream is decompressed using the metadata, and for inference the DNN is loaded into memory for inference on test data for the application at hand.

Encoder

Figure 2:
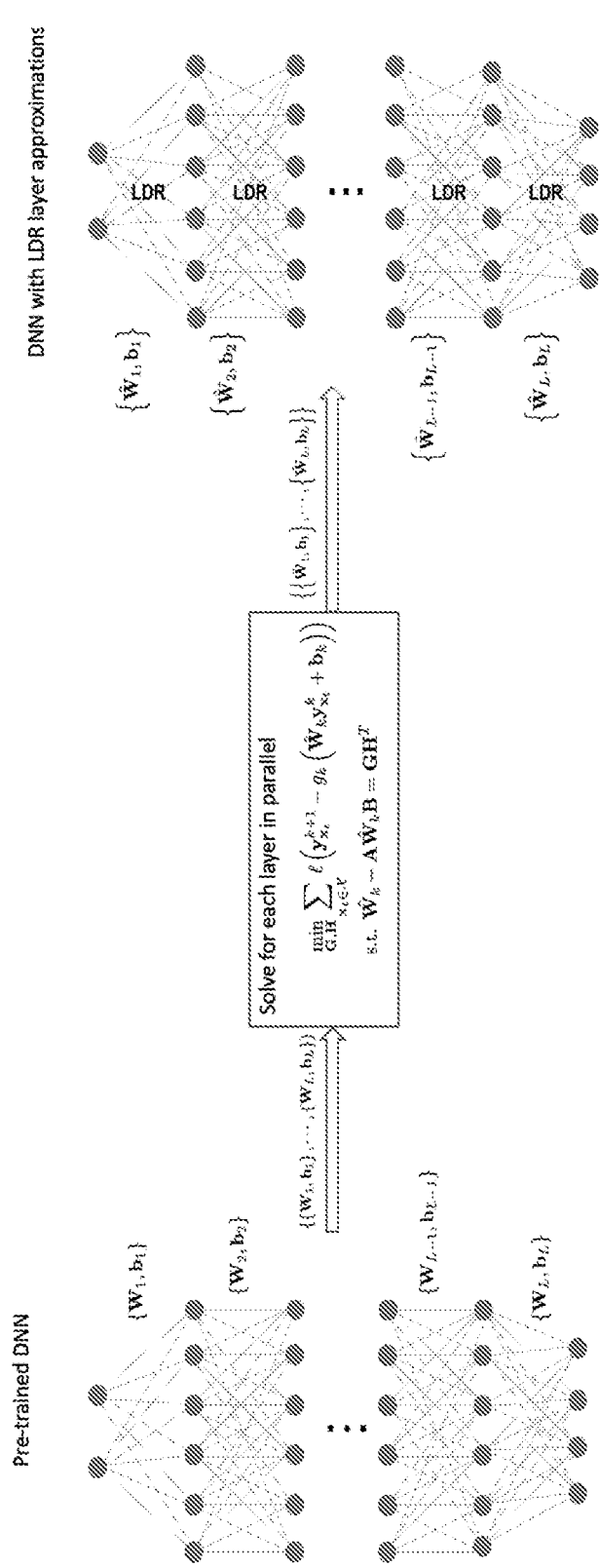
FIG. 2 shows low displacement rank approximation under the general aspects described.

FIG. 2 shows the LDR base approximation subblock in the FIG. 1 in detail. The LDR approximation for each layer can be obtained in parallel as shown in FIG. 2 using the approximation training set $\chi = \{x_1, \ldots, x_T\}$.

Figure 3:
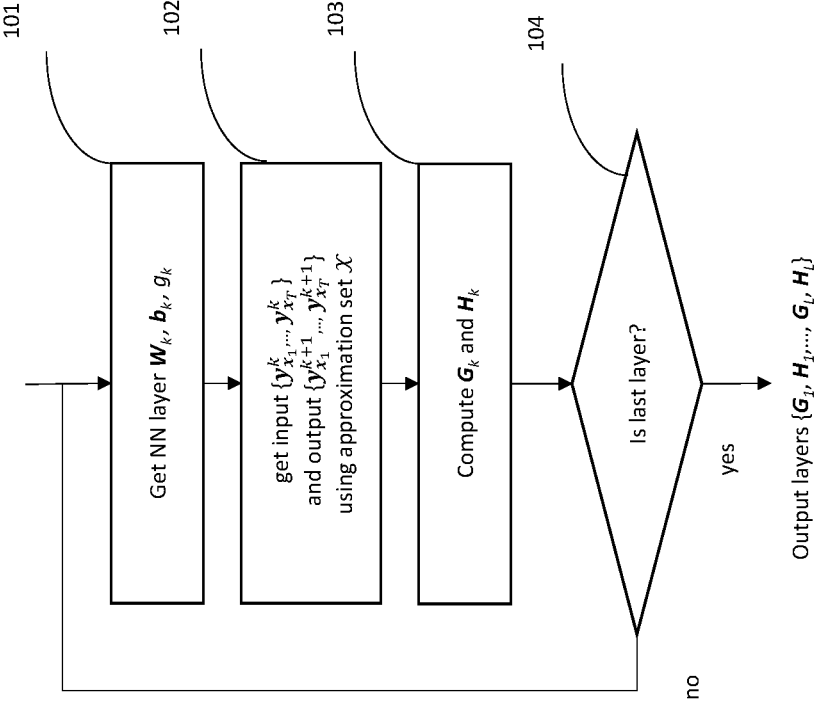
FIG. 3 shows a flow diagram for determining low displacement rank approximation layers under the general aspects described.

The LDR approximation of pre-trained DNN at the encoder is depicted in FIG. 3. Using the approximation training set $\chi$, we can obtain the output and input of each layer of the original pre-trained DNN. The input and output of the $k^{th}$ layer for a given example $x_t$ in the approximating set $\chi$ are denoted as $$y_{x_t}^k \text{ and } y_{x_t}^{k+1}.$$

Each layer can be accessed at step 101, potentially in parallel, looping from step 104 depending on computer resources, until last layer is processed. $G_k$ and $H_k$ are computed per layer at step 102 and 103.

Figure 4:
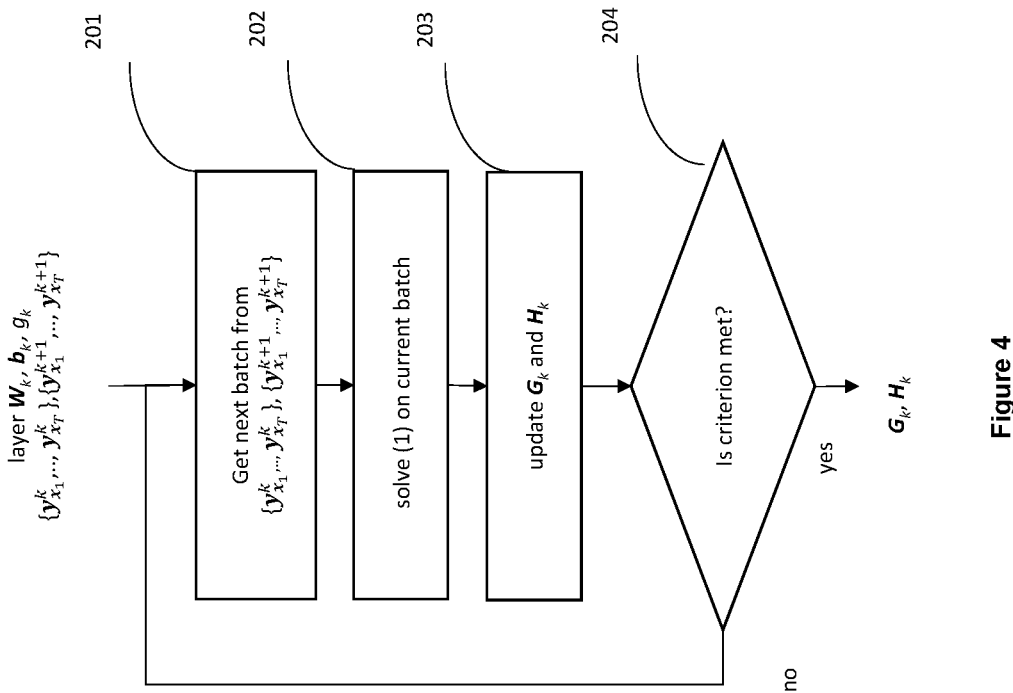
FIG. 4 shows an example of a flow diagram for a training/update loop for low displacement rank approximation estimation under the general aspects described.

The step 103 is further described in FIG. 4. For each layer, the approximation set can be split in batches and several iterations, or epochs, can be performed over the set (204). For each iteration, the current batch of input/output data for the layer is accessed (201), the minimization problem of figure (1) over this dataset (202), and the matrices $G_k$ and $H_k$ are updated (203).

The termination criterion (204) can be based on number of training steps in terms number of epochs or if matrices $G_k$ and $H_k$ in consecutive train steps are numerically close to each other with a chosen parameter of closeness, the matrices $G_k$ and $H_k$ are output for all k.

This parallel version allows for efficient computing at the cost of considering non-updated inputs to subsequent layers after the modification of the $G_k$ and $H_k$ matrices. The parallel version processes inputs and outputs of each layer in the original networks which are obtained once in the beginning and they are used to parallelly update the layers. The serial version is mentioned as a variant later in this description. As a variant, the output of each layer k can be updated using training data so that the LDR computation of layer k+1 can be performed using the proper input.

Decoder

Figure 5:
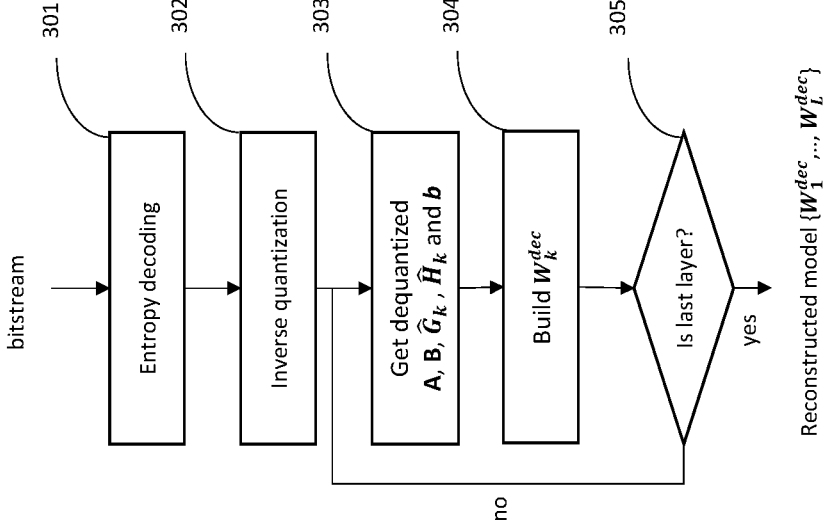
FIG. 5 shows an example of a decoding process under the general aspects described.

To decode the produced bitstream, a compatible decoder needs to perform the inverse compression steps. FIG. 5 details the different steps. The symbols of the input bitstream are first extracted from the entropy decoding engine 301, then inverse quantized (302). For each layer (305), the dequantized matrices are accessed (303) and each matrix $$W_k^{dec}$$

is derived from the obtained $G_k$ and $H_k$ using the inversion formulae previously mentioned.

Hence, to decode and obtain the reconstructed DNN, decoders that would implement a standard compression scheme, such as the future MPEG NNR standard, will require to include the proposed method.

In one variant, using one of the frameworks mentioned above, it is possible to use different A and B for each layer. This will change the meta data that is needed to be transmitted from the encoder. The decoder while decoding the layers will use specific A and B for that layer.

In a second variant, the LDR approximation can also be done in a serial fashion in which the next layer are approximated by taken into account the approximation in the previous layers.

Figure 6:
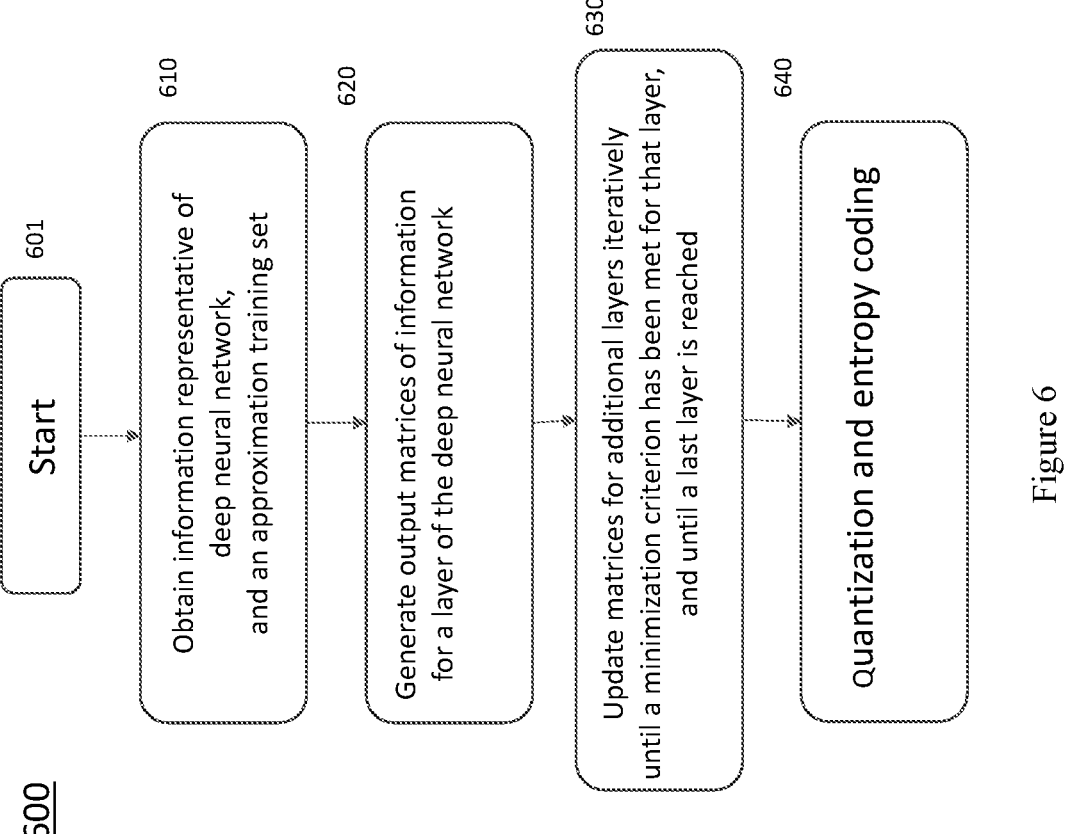
FIG. 6 shows one embodiment of an encoding method under the general aspects described.

One embodiment of a method 600 using the general aspects described here is shown in FIG. 6. The method commences at Start block 601 and control proceeds to function block 610 for obtaining information representative of weights, biases and non-linearities of a deep neural network, and an approximation training set for the deep neural network. Control then proceeds from block 610 to block 620 for generating output matrices of information for a layer of the deep neural network using the information and the approximation training set. Control then proceeds from block 620 to block 630 for updating output matrices for additional layers by iteratively using output matrices of previous layers of the deep neural network and the approximation training set until a minimization criterion has been met for that layer, and until a last layer is reached to generate coefficients representative of said output matrices. Control then proceeds from block 630 to block 640 for performing quantization and entropy coding on the coefficients.

Figure 7:
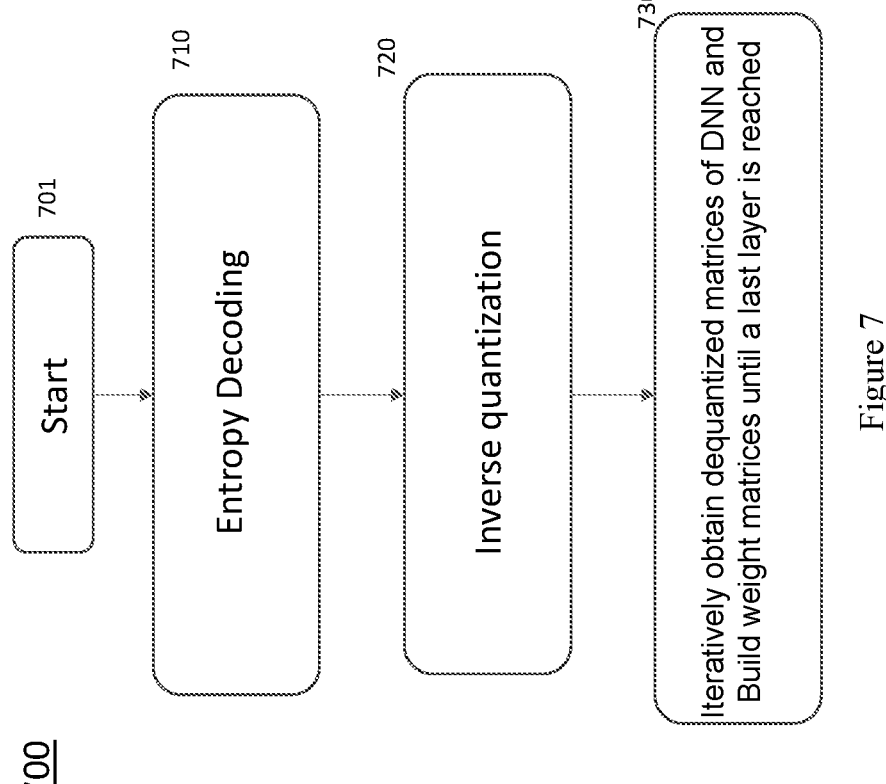
FIG. 7 shows one embodiment of a decoding method under the general aspects described.

One embodiment of a method 700 using the general aspects described here is shown in FIG. 7. The method commences at Start block 701 and control proceeds to function block 710 for performing entropy decoding on data from a bitstream. Control then proceeds from block 710 to block 720 for performing inverse quantization on the entropy decoded data. Control then proceeds from block 720 to block 730 for iteratively obtaining dequantized matrices representative of a deep neural network and building weight matrices until a last layer is reached.

Figure 8:
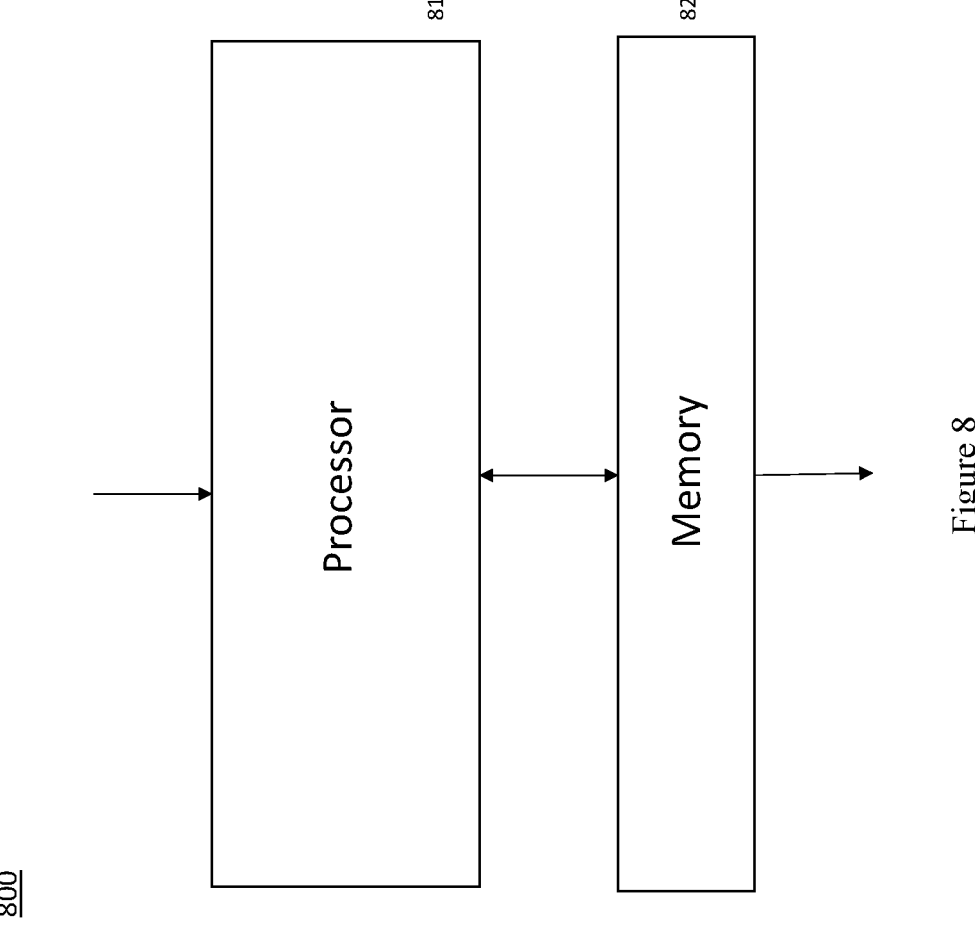
FIG. 8 shows one embodiment of an apparatus for encoding or decoding using intra prediction mode extensions.

FIG. 8 shows one embodiment of an apparatus 800 for compressing, encoding or decoding a deep neural network in a bitstream. The apparatus comprises Processor 810 and can be interconnected to a memory 820 through at least one port. Both Processor 810 and memory 820 can also have one or more additional interconnections to external connections.

Processor 810 is also configured to either insert or receive parameters in a bitstream and, either compressing, encoding or decoding a deep neural network using the parameters.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 9:
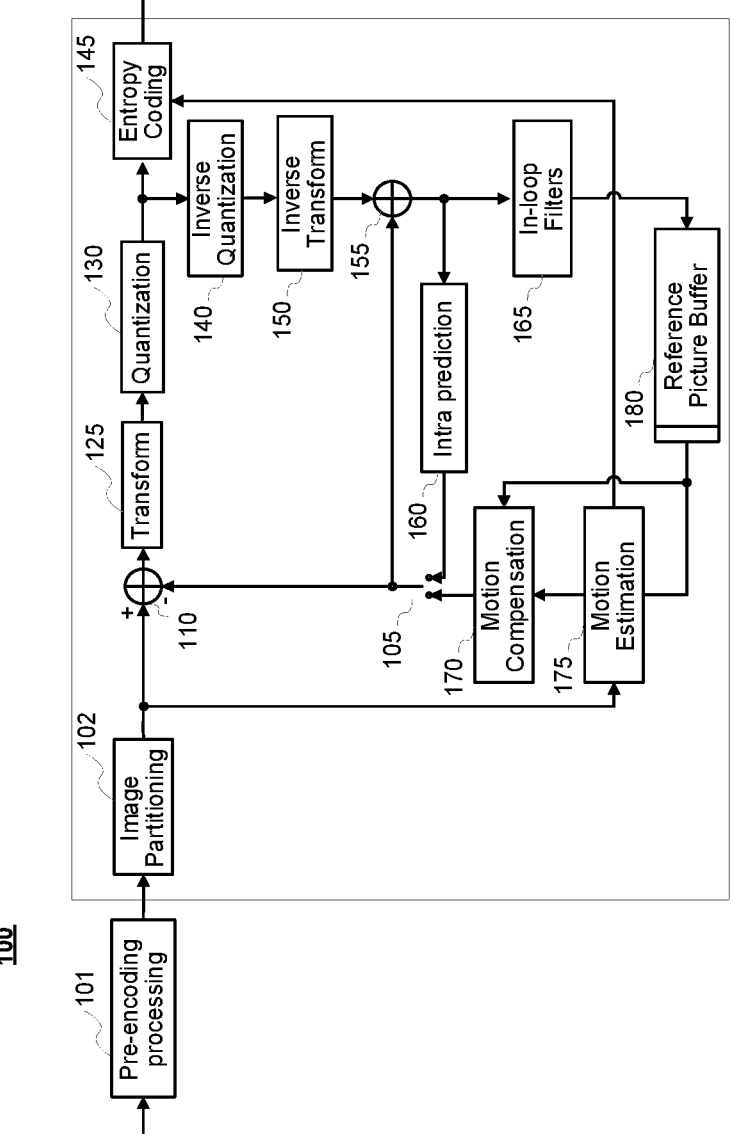
FIG. 9 shows a generic, standard encoding scheme.
Figure 10:
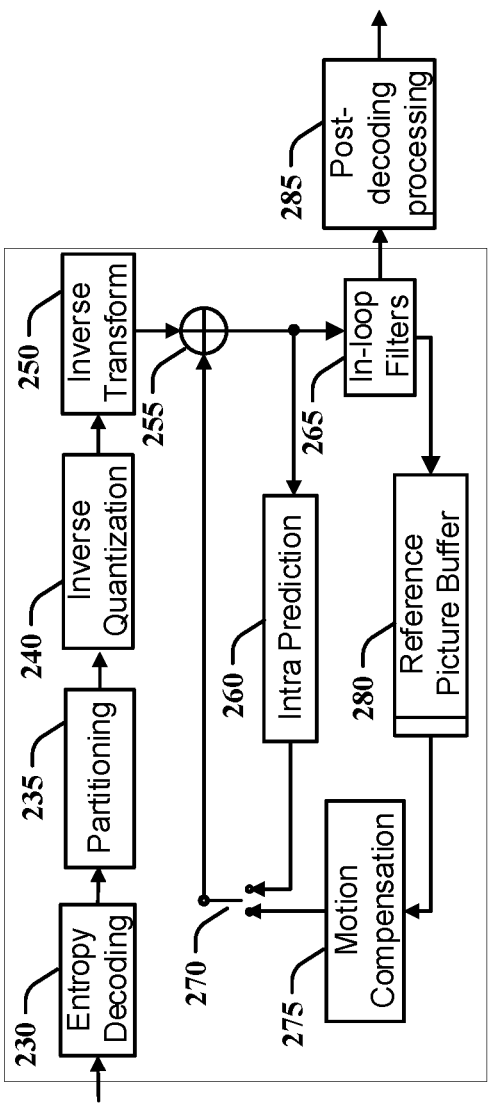
FIG. 10 shows a generic, standard decoding scheme.
Figure 11:
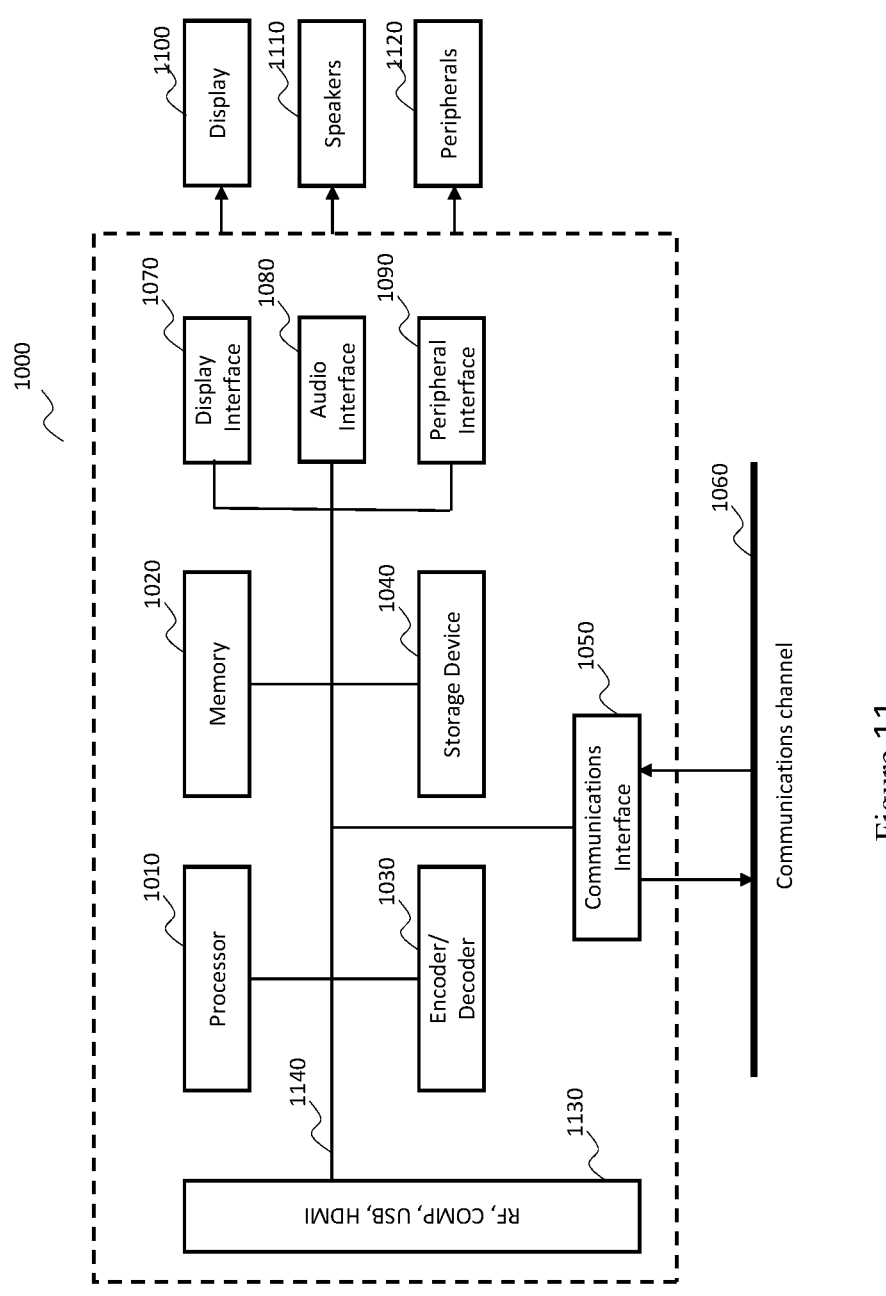
FIG. 11 shows a typical processor arrangement in which the described embodiments may be implemented.

The aspects described and contemplated in this application can be implemented in many different forms. FIGS. 9, 10, and 11 provide some embodiments, but other embodiments are contemplated and the discussion of FIGS. 9, 10, and 11 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 9 and FIG. 10. Moreover, the present aspects are not limited to WC or HEVC, and can be applied, for example, to other standards and recommendations, whether pre-existing or future-developed, and extensions of any such standards and recommendations (including WC and HEVC). Unless indicated otherwise, or technically precluded, the aspects described in this application can be used individually or in combination.

Various numeric values are used in the present application. The specific values are for example purposes and the aspects described are not limited to these specific values.

FIG. 9 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 10 illustrates a block diagram of a video decoder 200. In the decoder 200, a bitstream is decoded by the decoder elements as described below. Video decoder 200 generally performs a decoding pass reciprocal to the encoding pass as described in FIG. 9. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 11 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 11, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (12C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display.

The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to perform encoding and decoding with deep neural network compression of a pre-trained deep neural network.

A process or device to perform encoding and decoding with inserted information in a bitstream representative of parameters to implement deep neural network compression of a pre-trained deep neural network comprising one or more layers.

A process or device to perform encoding and decoding with inserted information in a bitstream representative of parameters to implement deep neural network compression of a pre-trained deep neural network until a compression criterion is reached.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A computer-implemented method for compressing a deep neural network used in multimedia data processing, the method comprising:

obtaining information representative of weights, biases and non-linearities of a deep neural network representative of multimedia data, and an approximation training set for the deep neural network;

generating inputs and outputs of at least one layer of the deep neural network based on the weights, biases and non-linearities for the at least one layer and based on the approximation training set;

determining output matrices based on the obtained inputs and outputs of the at least one layer, said output matrices being used to derive a low displacement rank approximation of the weights of said at least one layer; wherein determining the output matrices comprises:

generating current output matrices for the at least one layer using a current batch of inputs and outputs of the at least one layer wherein generating comprises minimizing an error between generated outputs of the at least one layer and corresponding outputs obtained from low displacement rank approximation of the weights which comprises minimizing over the output matrices ($G_k$, $H_k$) the following sum $\Sigma_{x_t \in \chi} 1 (y_{x_t}^{k+1} - g_k (\hat{W}_k y_{x_t}^{k} + b_k))$ under the constraint $\hat{W}_k - A\hat{W}_k B = G_k H_k^T$, where $y_{x_t}^{k+1}$ are the outputs of the $k^{th}$ layer for an element $x_t$ of the approximation training set, $y_{x_t}^{k}$ are the inputs of the $k^{th}$ layer, A and B are predefined matrices, $b_k$ are the bias of the $k^{th}$ layer, $g_k$ are the non-linearity of the $k^{th}$ layer, $\hat{W}_k$ are the low displacement rank approximation of the weights;

updating output matrices generated for a previous iteration based on the current output matrices;

repeating generating and updating with a next batch until a minimization criterion has been met for the at least one layer; and performing quantization and entropy coding of coefficients of the output matrices in a bitstream.

2. The method of claim 1, wherein said approximation training set comprises a subset of an original training set of the deep neural network.

3. A non-transitory computer readable medium containing data content generated according to the method of claim 1, for playback using a processor.

4. A computer program product comprising instructions which, when the program is executed by a computer, cause the computer to carry out the method of claim 1.

5. An apparatus for compressing a deep neural network used in multimedia data processing, comprising: a processor, configured to perform:

obtaining information representative of weights, biases and non-linearities of a deep neural network representative of multimedia data, and an approximation training set for the deep neural network;

generating inputs and outputs of at least one layer of the deep neural network based on the weights, biases and non-linearities for the at least one layer and based on the approximation training set;

determining output matrices based on the obtained inputs and outputs of the at least one layer, said output matrices being used to derive a low displacement rank approximation of the weights of said at least one layer; wherein determining the output matrices comprises:

generating current output matrices for the at least one layer using a current batch of inputs and outputs of the at least one layer wherein generating comprises minimizing an error between generated outputs of the at least one layer and corresponding outputs obtained from low displacement rank approximation of the weights which comprises minimizing over the output matrices ($G_k$, $H_k$) the following $\Sigma_{x_t \in \chi} 1 (y_{x_t}^{k+1} - g_k (\hat{W}_k y_{x_t}^{k} + b_k))$ under the constraint $\hat{W}_k - A\hat{W}_k B = G_k H_k^T$, where $y_{x_t}^{k+1}$ are the outputs of the $k^{th}$ layer for an element $x_t$ of the approximation training set, $y_{x_t}^{k}$ are the inputs of the $k^{th}$ layer, A and B are predefined matrices, $b_k$ are the bias of the $k^{th}$ layer, $g_k$ are the non-linearity of the $k^{th}$ layer, $\hat{W}_k$ are the low displacement rank approximation of the weights;

updating output matrices generated for a previous iteration based on the current output matrices;

repeating generating and updating with a next batch until a minimization criterion has been met for the at least one layer; and performing quantization and entropy coding of coefficients of the output matrices into a bitstream.

6. The apparatus of claim 5, wherein said approximation training set comprises a subset of an original training set of the deep neural network.

* * * * *